United States Patent [19]
Handel

[11] Patent Number: 5,862,747
[45] Date of Patent: Jan. 26, 1999

[54] APPARATUS AND METHOD FOR PRESSING MEAT PRODUCTS

[75] Inventor: Gary A. Handel, Austin, Minn.

[73] Assignee: Hormel Foods, LLC, Austin, Minn.

[21] Appl. No.: 839,234

[22] Filed: Apr. 24, 1997

[51] Int. Cl.⁶ .................................................. B30B 7/02
[52] U.S. Cl. ........................... 100/194; 99/349; 100/204; 100/269.02; 100/910
[58] Field of Search ................................. 100/194, 199, 100/204, 219, 269.02, 269.04, 910; 99/349, 353; 425/338, 339

[56] References Cited

U.S. PATENT DOCUMENTS

| | | | |
|---|---|---|---|
| 1,121,470 | 12/1914 | Bushnell | 100/199 |
| 2,094,862 | 10/1937 | Welch | 100/199 |
| 3,473,465 | 10/1969 | Tonjum | 100/194 |
| 3,618,511 | 11/1971 | Matthews | 100/194 |
| 3,750,563 | 8/1973 | Tonjum | 100/194 |
| 4,341,154 | 7/1982 | Orlowski et al. | 100/194 |
| 4,604,949 | 8/1986 | Giese | 100/194 |
| 4,709,446 | 12/1987 | Feauto et al. | 100/194 |
| 4,817,511 | 4/1989 | Huang et al. | 100/219 |
| 5,381,725 | 1/1995 | Breunig et al. | 100/910 |
| 5,499,575 | 3/1996 | Handel et al. . | |

Primary Examiner—Stephen F. Gerrity
Attorney, Agent, or Firm—Mau & Krull, P.A.

[57] ABSTRACT

The present invention relates generally to a system for pressing meat products. The system includes a press rack having platens that are movable between a loading position in which meat products can be loaded between the platens, and a pressing position in which the platens are adapted to press the meat products. A hydraulic locking and release mechanism is used to selectively retain the platens in the pressing position. The system also includes a floor mounted closing unit that provides the power for moving the press rack from the loading position to the pressing position.

15 Claims, 15 Drawing Sheets

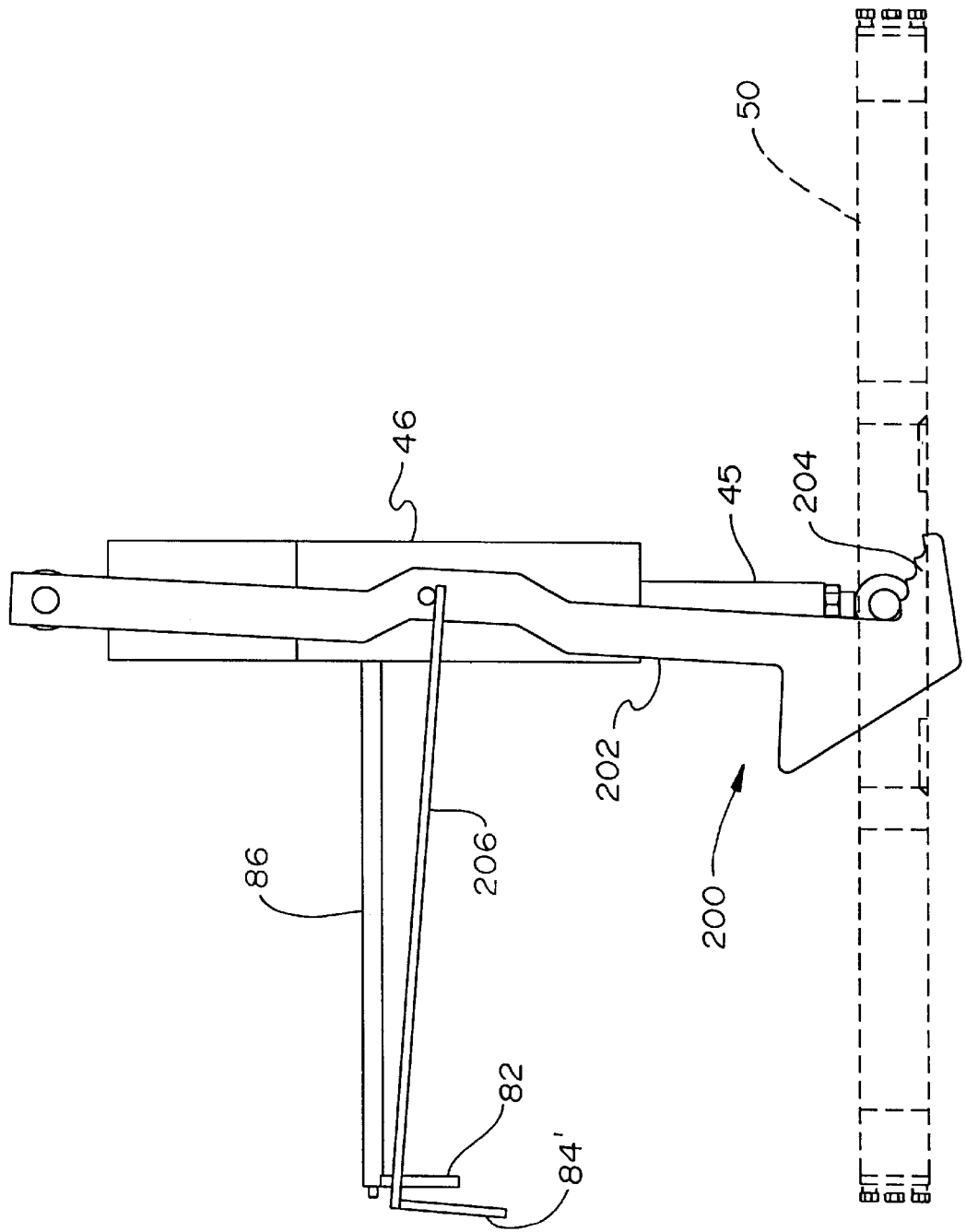

APPARATUS AND METHOD FOR PRESSING MEAT PRODUCTS

FIELD OF THE INVENTION

The present invention relates generally to presses. More specifically, the present invention relates to multi-layered press racks for pressing meat products and methods of use.

Background of the Invention

Multi-layered press racks are used in the meat processing industry for the rapid pressing of viscous meat products that are contained within a membrane such as a casing. Exemplary meat products include sausage, ham, and any other meat products commonly contained within casings. Press racks are typically used to impart a desired thickness or shape to the encased meat products while concurrently allowing air flow about the meat products. While the meat products are pressed, the meat products are concurrently smoked or otherwise cooked thereby causing the meat products to solidify. By cooking the meat products within a press rack, the cooked meat products retain the desired shape or thickness imparted by the press rack even after they have been removed from the press rack.

A variety of concerns exist with respect to the manner in which meat products are pressed and processed. For example, one concern relates to providing press racks that are safe to operate. Another concern relates to providing press racks that can efficiently be opened and closed. A further concern relates to press racks that can be used to press meat products having varying sizes and dimensions. Still another concern relates to press racks that open in a safe and controlled manner. An additional concern relates to press racks having locking mechanisms that can be safely disengaged without requiring the racks to pre-tensioned by an external closing unit. Still a further concern relates to meat processing systems that allow meat products to be pressed in a safe, efficient, and cost effective manner. The present invention addresses these concerns as well as other concerns.

SUMMARY OF THE INVENTION

One aspect of the present invention relates to an apparatus for pressing meat products. The apparatus includes a first frame structure including a plurality of fixedly spaced apart first platens and a second frame structure including a plurality of fixedly spaced apart second platens. The first and second frame structures are arranged such that the pluralities of first and second platens are aligned in a stack with each of the second platens being positioned below a respective one of the first platens. The first and second frames are slidably interconnected and relatively movable between a loading position in which meat products can be loaded between the first and second platens, and a pressing position in which the first and second platens are adapted to press the meat products. The apparatus also includes a locking mechanism constructed and arranged to selectively prevent the first and second frame structures from moving from the pressing position to the loading position. The locking mechanism includes a piston reciprocally mounted within a hydraulic cylinder. The hydraulic cylinder and the piston are operatively connected between the first and second frame structures.

The above-described apparatus provides numerous advantages over the prior art. For example, the hydraulic cylinder and piston configuration provides a positive locking mechanism that allows the apparatus to accommodate meat products of varying sizes. Specifically, the hydraulic cylinder and piston configuration is adapted to allow the pressing position spacing between the pluralities of first and second platens to be variably set depending upon the size of the meat products desired to be pressed. Additionally, no pre-tensioning is required to release the positive lock provided by the hydraulic cylinder and piston. Instead, the positive lock can be released by merely opening a valve. Upon release, the piston and cylinder configuration is adapted to allow the first and second frame structures to move from the pressing position to the loading position in a safe controlled manner.

Another aspect of the present invention relates to a system for pressing meat products. The system includes at least one press rack having a first frame including a plurality of first platens and a second frame including a plurality of second platens. The first and second frames are slidably moveable with respect to one another between a loading position in which meat products can be loaded between the first and second platens, and a pressing position in which the first and second platens are adapted to press the meat products. The system also includes a trolley assembly for conveying the press rack along a selected route. Additionally, the system further includes a closing unit positioned along the route for moving the first and second frames of the press rack from the loading position to the pressing position. The closing unit includes an anchoring frame slidably connected to a lift frame. The anchoring frame is secured to a floor surface and is configured for anchoring the first frame of the press rack relative to the floor surface. The closing unit is also equipped with a lift mechanism for moving the lift frame relative to the anchoring frame. When the first frame of the press rack is anchored by the anchoring frame, the lift frame and the lift mechanism cooperate to move the second frame of the press rack relative to the first frame of the press rack.

Still another aspect of the present invention relates to a method for pressing meat products with a press rack that includes a plurality of stacked platens that are movable between a loading position in which meat products can be loaded between the platens and a pressing position in which the platens are adapted to press the meat products. The method includes the steps of moving the platens to the loading position, and loading the meat products between the platens. The method also includes the steps of moving the platens to the pressing position such that the meat products are compressed between the platens, and using a hydraulic cylinder to retain the platens in the pressing position.

A variety of additional advantages of the invention will be set forth in part in the description which follows, and in part will be obvious from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several embodiments of the invention and together with the description, serve to explain the principles of the invention. A brief description of the drawings is as follows:

FIG. 13A illustrates a safety lock for use with the press rack of the present invention, the lock is shown in a locked position.

DETAILED DESCRIPTION OF THE DRAWINGS

Figure 1:
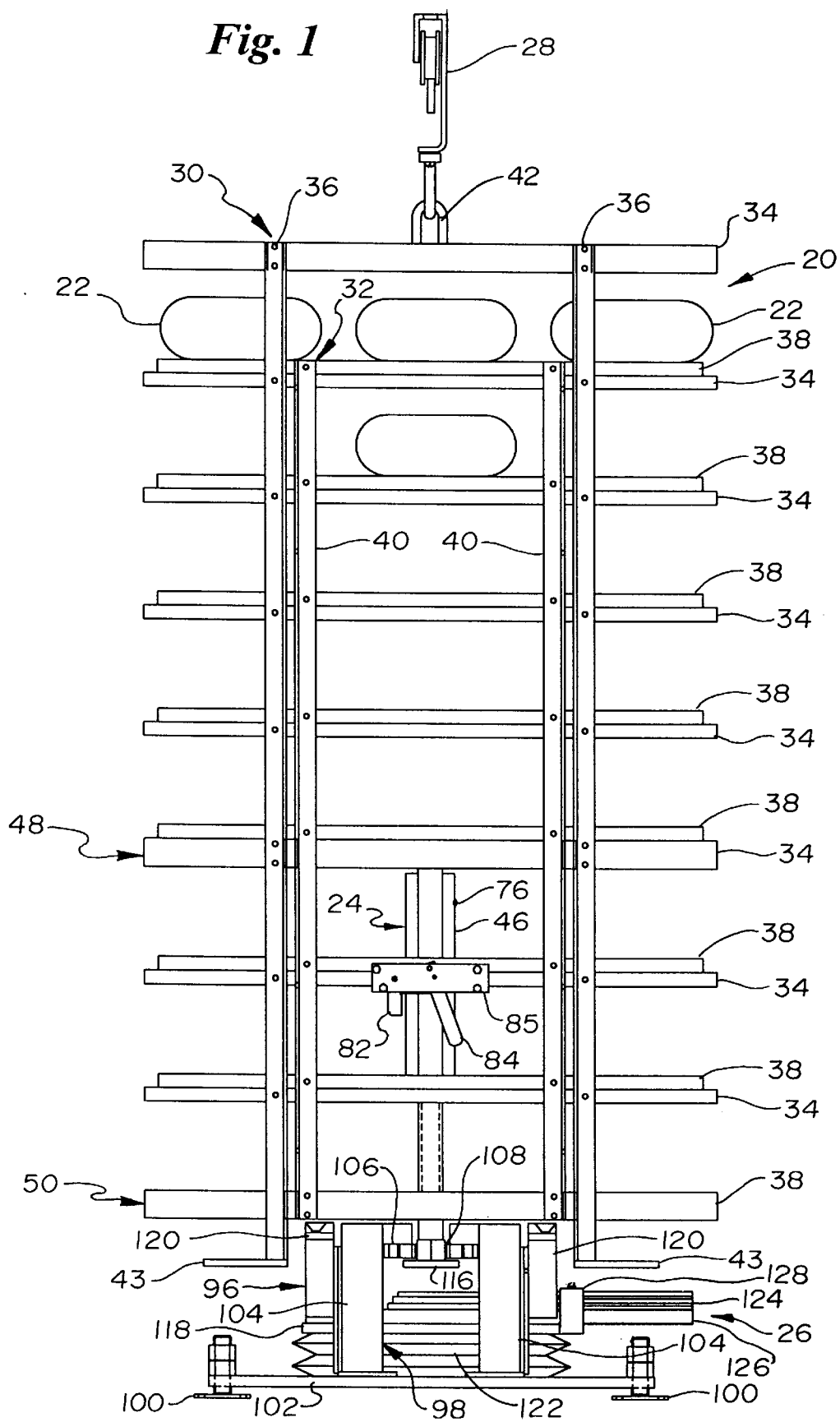
FIG. 1 is a front view of an exemplary press rack and closing unit constructed in accordance with the principles of the present invention, the press rack is shown in a loading configuration.

Reference will now be made in detail to exemplary embodiments of the present invention which are illustrated in the accompanying drawings. Wherever possible, the same reference numbers will be used throughout the drawings to refer to the same or like parts.

FIGS. 1–5 show a meat pressing system including a press rack 20 constructed in accordance with the principles of the present invention. Generally, the press rack 20 is a multiple layer press having a plurality of vertically stacked platens. The press rack 20 is movable between a loading position (shown in FIGS. 1 and 3) in which meat products 22 can be loaded between the platens, and a pressing position (shown in FIGS. 2 and 4) in which the platens are adapted to press the meat products 22. A hydraulic locking and release mechanism 24 functions to selectively retain the press rack 20 in the pressing position. The meat pressing system also includes a closing unit 26 for moving the press rack 20 from the loading position to the pressing position.

In basic use, the press rack 20 is moved to the loading position (shown in FIGS. 1 and 3) and the meat products 22 are loaded between the platens. Once the rack 20 is loaded, the rack 20 is moved from the loading position to the pressing position (shown in FIGS. 2 and 4) by the closing unit 26. As the press rack 26 is closed, the meat products 22 are compressed to a desired size and shape. The hydraulic locking and release mechanism 24 functions to retain the press rack 20 in the loading position such that constant pressure is maintained upon the meat products 22. After the press rack 20 has been locked in the pressing position, the press rack is moved by such means as a trolley 28 mounted on an overhead rail to a cooking station where the pressed meat products 22 are cooked by conventional techniques such as smoking. As the meat products 22 cook, the meat products solidify and retain their pressed shape. After the meat products 22 have been cooked, the press rack 20 is moved by the trolley 28 from the cooking station to an unloading station. At the unloading station, the press rack is moved from the pressing position to the loading position. With the rack 20 in the loading position, the solidified meat products 22 can be readily removed from the rack 20. As a final step in the process, the press rack 20 is cleaned and prepared for reloading with a new batch of meat products. Further details concerning the construction and method of operation of the press rack will be described in the following paragraphs.

The press rack 20 includes a first frame 30 that is intermeshed and slidably interconnected with a second frame 32. The first frame 30 includes a plurality of vertically spaced and substantially parallel top platens 34. The top platens 34 are fixedly interconnected by four outer angle irons 36. The outer angle irons 36 maintain a fixed vertical spacing between each of the top platens 34.

The second frame 32 includes a plurality of vertically spaced and substantially parallel bottom platens 38. The bottom platens 38 are interconnected by four inner angle irons 40 that are positioned inside and substantially parallel to the outer angle irons 36. The inner angle irons 40 function to maintain a fixed vertical spacing between the bottom platens 38.

The first and second frames 30 and 32 are intermeshed such that the top and bottom platens 34 and 38 are alternately vertically positioned relative to one another. In this manner, the top and bottom platens 34 and 38 are aligned in a substantially vertical stack with each of the bottom platens 38 being located below a respective one of the top platens 34. Consequently, each of the bottom platens 38, with the exception of the lowermost bottom platen 38, is captured between two top platens 34. Similarly, each of the top platens 34, with the exception of the uppermost top platen 34, is captured between two of the bottom platens 38.

The outer and inner angle irons 36 and 40 are configured for allowing the first and second frames 30 and 32 to vertically slide relative to one another. Spacers or bearings 42 (shown in FIG. 5), preferably made of plastic, are positioned between the outer and inner angle irons 36 and 40 to facilitate sliding motion between the angle irons and to prevent metal on metal contact between the first and second frames 30 and 32. The press rack 20 is moved between the loading position (shown in FIGS. 1 and 3) and the pressing position (shown in FIGS. 2 and 4) by vertically sliding the first and second frames 30 and 32 relative to one another. In the loading position, a relatively large gap exists between each top and bottom platen 34 and 38. As the press rack 20 is moved from the loading position toward the pressing position, the bottom platens 38 move toward the top platens 34 such that the gaps between the platens become more narrow. Eventually, the gap between each top and bottom platen 34 and 38 becomes so narrow that meat products 22 positioned between the top and bottom platens 34 and 38 are compressed.

Referring back to FIGS. 1–4, the uppermost top platen includes a loop 42 for allowing the rack 20 to be suspended beneath the trolley 28. The uppermost top platen also includes extra reinforcement for allowing the uppermost top platen to support the weight of the rack 20 when the rack 20 is suspended beneath the trolley 28. Additionally, referring to FIGS. 1–4, it is noted that the bottom platens 38 are smaller than the top platens 34. This variation in sizes is a safety feature that helps prevent an operator from pinching his or her fingers between the platens.

Each component of the press rack 20 is preferably constructed of stainless steel to facilitate cleaning of the rack 20. For example, all of the press platens preferably have press surfaces constructed of stainless steel mesh suitable for allowing air to readily circulate about meat products held by the rack 20. Also, the press rack 20 is equipped with feet 43 for supporting the rack 20 on the floor or ground when the rack 20 is not suspended beneath the trolley 28. Furthermore, the rack 20 preferably includes cross members (not shown for clarity reasons) connected between the inner angle irons 40 for providing lateral support to the press rack 20.

The hydraulic locking and release mechanism 24 of the press rack 20 includes a piston 44, having a piston head 43 and a first piston rod 45, that is reciprocally mounted within a hydraulic cylinder 46. The hydraulic cylinder 46 is connected to a reinforced top platen 48 while the first piston rod 45 is connected to a reinforced bottom platen 50. The hydraulic cylinder 46 and the piston 44 extend generally perpendicularly between the reinforced top and bottom platens 48 and 50 and are aligned generally along a central longitudinal axis of the press rack 20. In extending between the reinforced top and bottom platens 48 and 50, the hydraulic cylinder 46 and piston 44 extend through central apertures defined by the intermediate platens located between the reinforced top and bottom plates 48 and 50.

Figure 6:
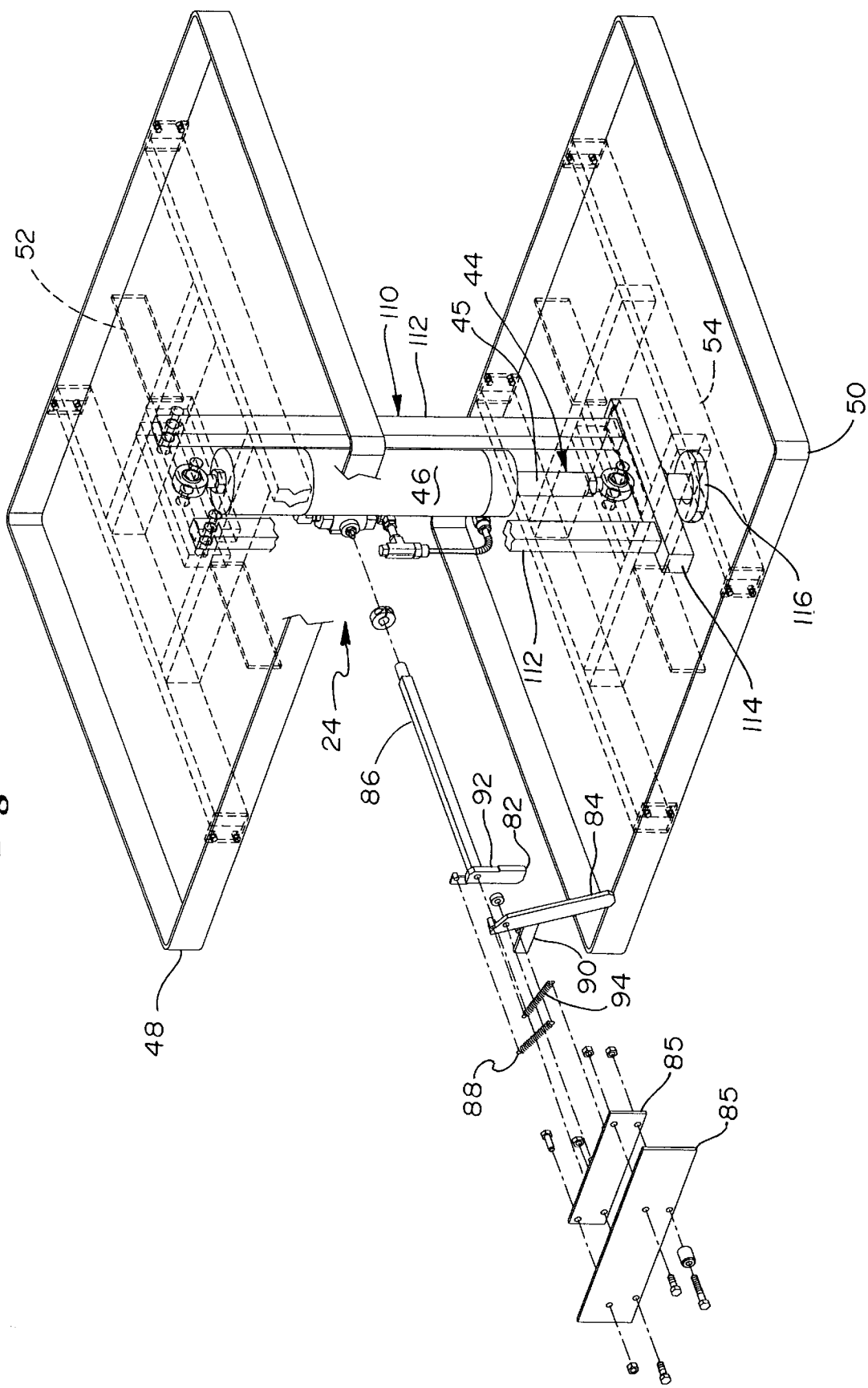
FIG. 6 is a detailed view of a hydraulic lock and release mechanism utilized by the press rack of FIG. 1.

FIG. 6 shows further details regarding how the hydraulic cylinder 46 and piston 44 are interconnected between the reinforced top and bottom plates 48 and 50. Specifically, as shown in FIG. 6, the hydraulic cylinder 46 is bolted, pinned, or otherwise secured to a first reinforcing weldment 52 (shown in hidden lines) that is secured to the reinforced top plate 48. Similarly, the piston rod 45 is bolted, pinned, or otherwise connected to a second weldment 54 (shown in hidden lines) that is secured to the reinforced bottom plate 50. For the purpose of clarity, the intermediate platens located between the reinforced top platen 48 and the reinforced bottom platen 50 are not shown in FIG. 6.

Although the above-described mounting configuration of the hydraulic cylinder 46 and piston rod 45 is preferred, it will be appreciated that a variety of other mounting configurations could also be utilized. The prevalent factor in designing a suitable mounting configuration for the hydraulic cylinder 46 and piston rod 45 is to connect the hydraulic cylinder 46 to one of the first and second frames 30 and 32, and the piston rod 45 to the other of the first and second frames 30 and 32. In this manner, the piston 44 will be configured to reciprocate within the hydraulic cylinder 46 as the press rack 20 is moved between the loading position (shown in FIGS. 1 and 3) and the pressing position (shown in FIGS. 2 and 4).

Figure 7:
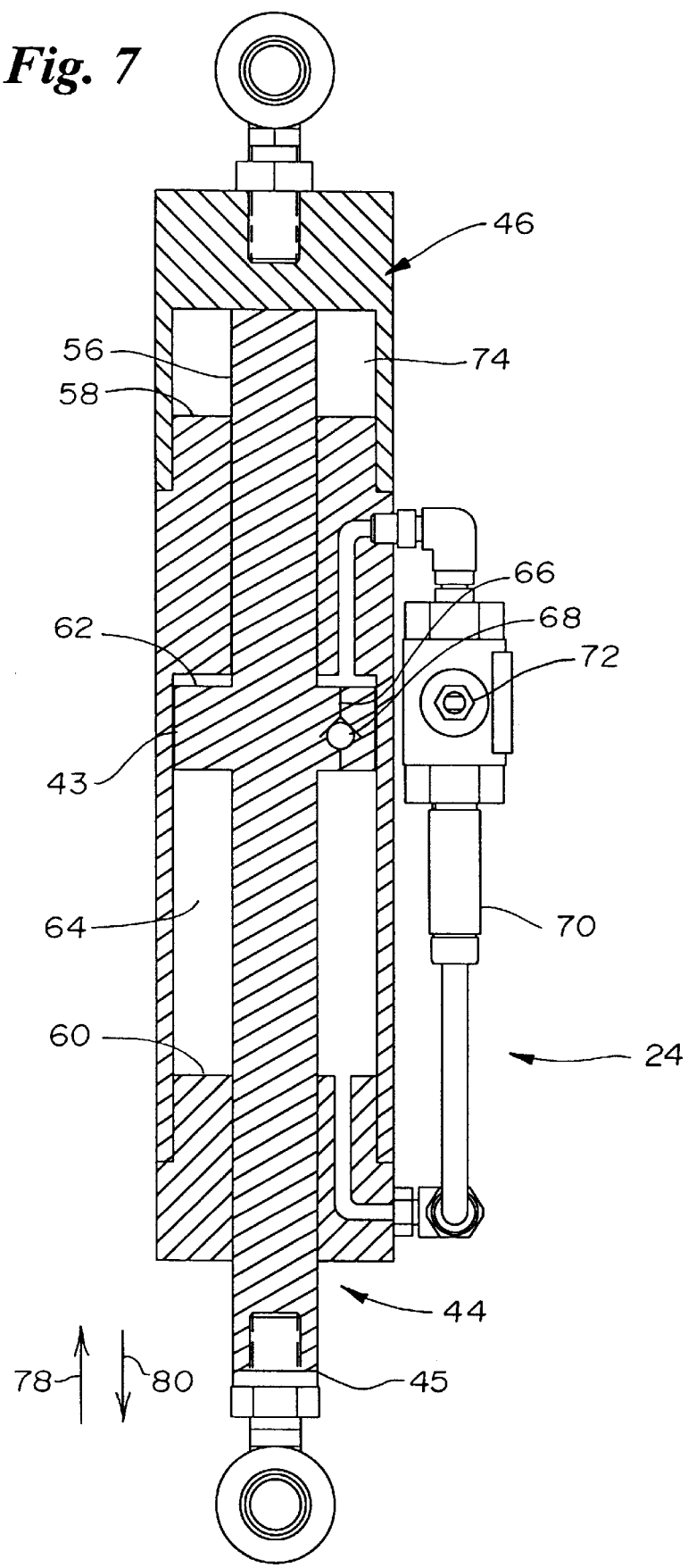
FIG. 7 is a longitudinal cross sectional view of the hydraulic cylinder and piston shown in FIG. 6, the piston is shown in a retracted position.
Figure 8:
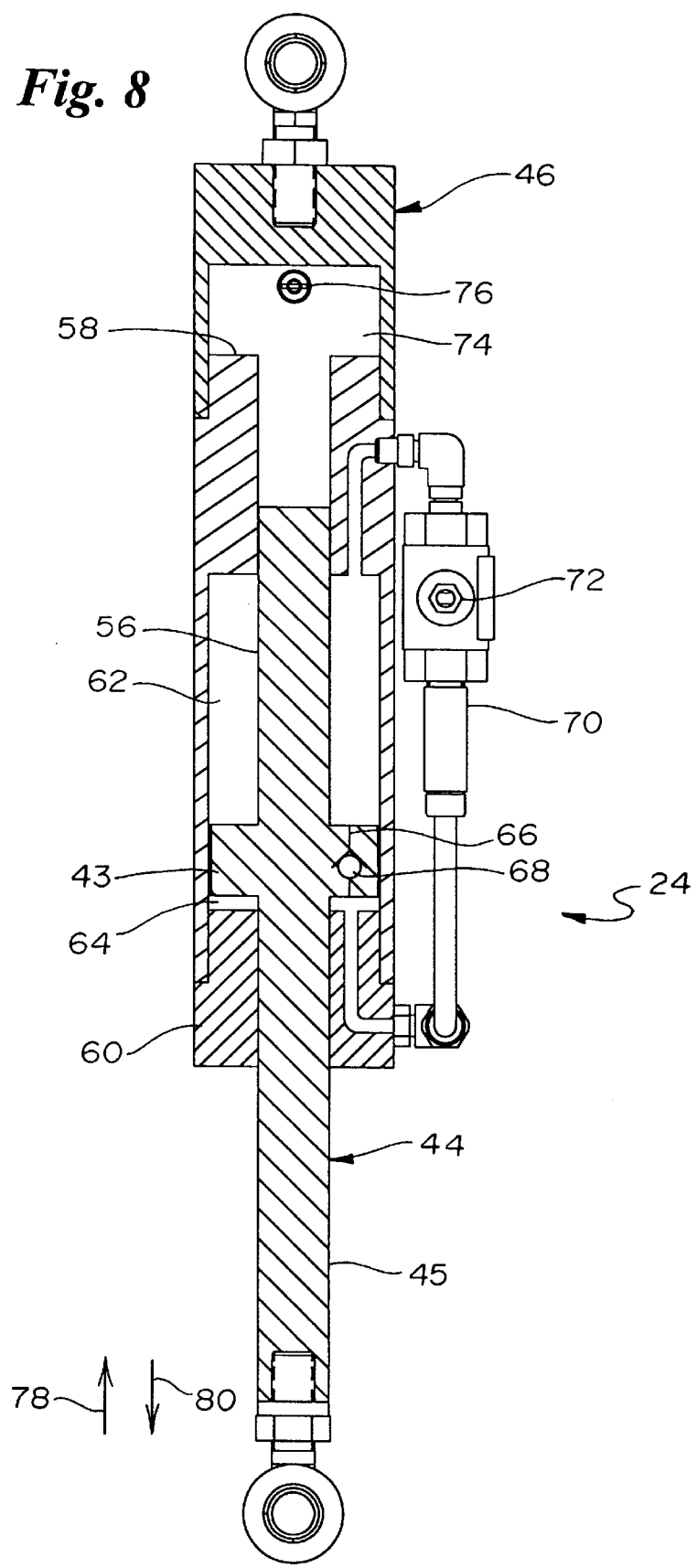
FIG. 8 is a longitudinal cross sectional view of the hydraulic cylinder and piston of FIG. 6, the piston is shown in an extended position.

The hydraulic lock and release mechanism 24 of the press rack 20 includes a sealed hydraulic system, the details of which are illustrated in FIGS. 7 and 8. Referring to FIGS. 7 and 8, the piston 44 includes the piston head 43, the first piston rod 45, and an internal second piston rod 56. The second piston rod 56 is secured to a top side of the piston head 43 and is reciprocally mounted within a first linear bearing structure 58 that forms a part of the hydraulic cylinder 46 body. The first piston rod 45 is secured to the bottom side of the piston head 43 and is reciprocally mounted within a second linear bearing structure 60 that also forms a portion of the body of the hydraulic cylinder 46.

A circumferential seal exists between the piston head 43 and the inner surface of the hydraulic cylinder 46. A top hydraulic fluid reservoir 62 is located directly above the top of the piston head 43 while a bottom hydraulic fluid reservoir 64 is located directly below the bottom of the piston head 43. A first hydraulic fluid flow line 66 extends through the piston head 43 between the top and bottom fluid reservoirs 62 and 64. A one-way valve 68 controls fluid flow through the first hydraulic fluid flow line 66. The one-way valve 68 is configured to only allow fluid flow from the top fluid reservoir 62 to the bottom fluid reservoir 64. Consequently, hydraulic fluid is not allowed to flow through the first flow line 66 from the bottom fluid reservoir 64 to the top fluid reservoir 62.

The hydraulic lock and release mechanism 24 also includes a second hydraulic fluid flow line 70 that provides fluid communication between the top and bottom fluid reservoirs 62 and 64 and that is arranged in parallel with respect to the first hydraulic fluid flow line 66. Fluid flow through the second flow line 70 is controlled by a manual valve 72. When the manual valve 72 is open, fluid flow through the second flow line 70 is allowed in either direction between the top and bottom fluid reservoirs 62 and 64. In contrast, when the manual valve 72 is closed, no fluid flow is allowed through the second flow line 70.

The hydraulic lock and release system 24 also includes a make-up reservoir 74 positioned above the first linear bearing structure 58. An access opening 76 sealed by a removable screw allows a user of the hydraulic lock and release system 24 to access the sealed hydraulic system. For example, assuming the hydraulic cylinder 46 is oriented in the vertical orientation shown in FIGS. 1–4, the hydraulic system can be refilled with hydraulic fluid by pumping hydraulic fluid through the access opening 76. The orientation of the access opening 76 adjacent to the top of the hydraulic cylinder 46 allows the system to be substantially filled with hydraulic fluid. Specifically, if the hydraulic system is filled until the hydraulic fluid reaches the elevation of the access opening 76, the only air present in the system will be located in the small region positioned above the access opening 76.

Figure 2:
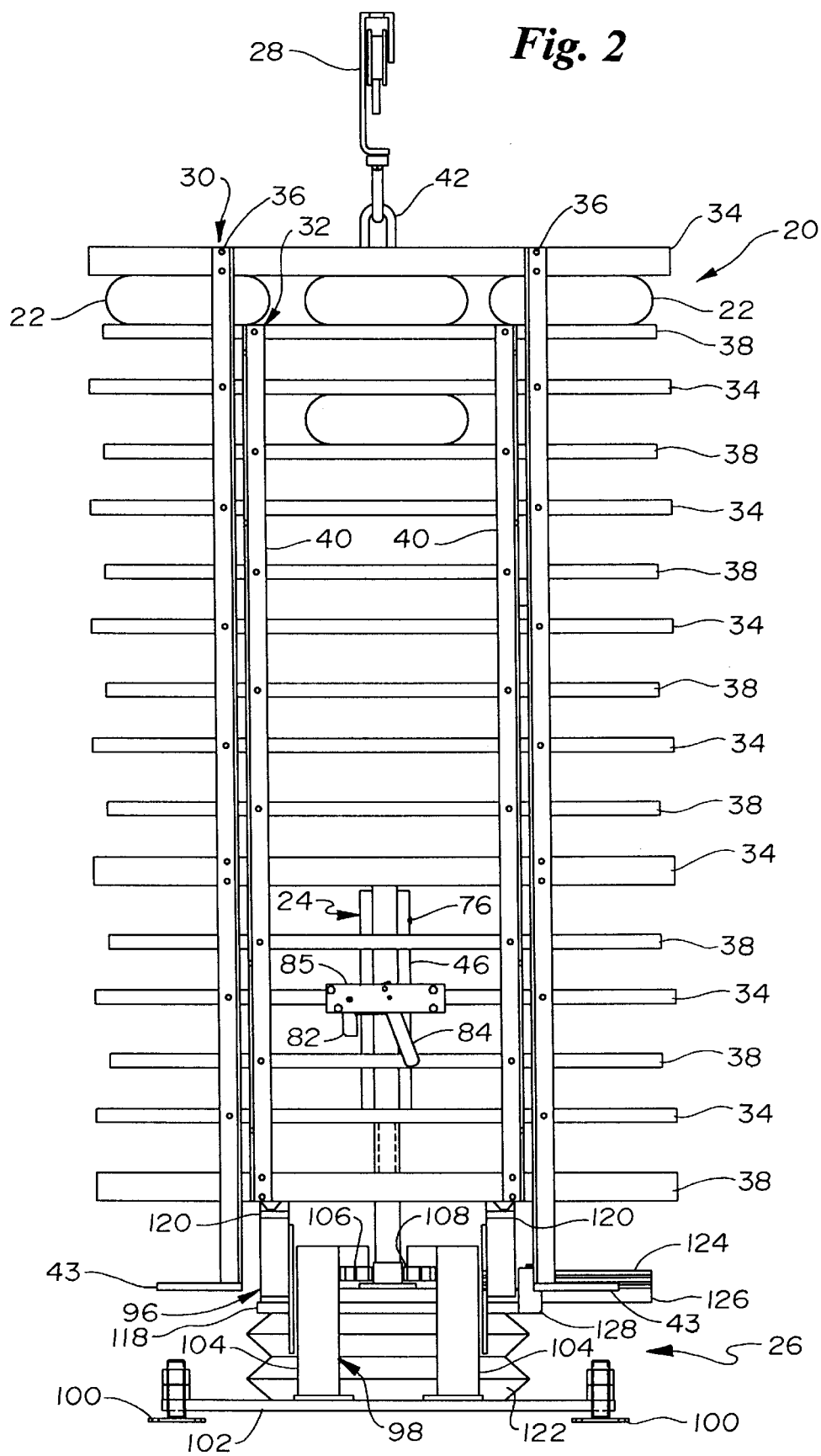
FIG. 2 is a front view of the press rack and closing unit of FIG. 1, the press rack is shown in a pressing position.
Figure 3:
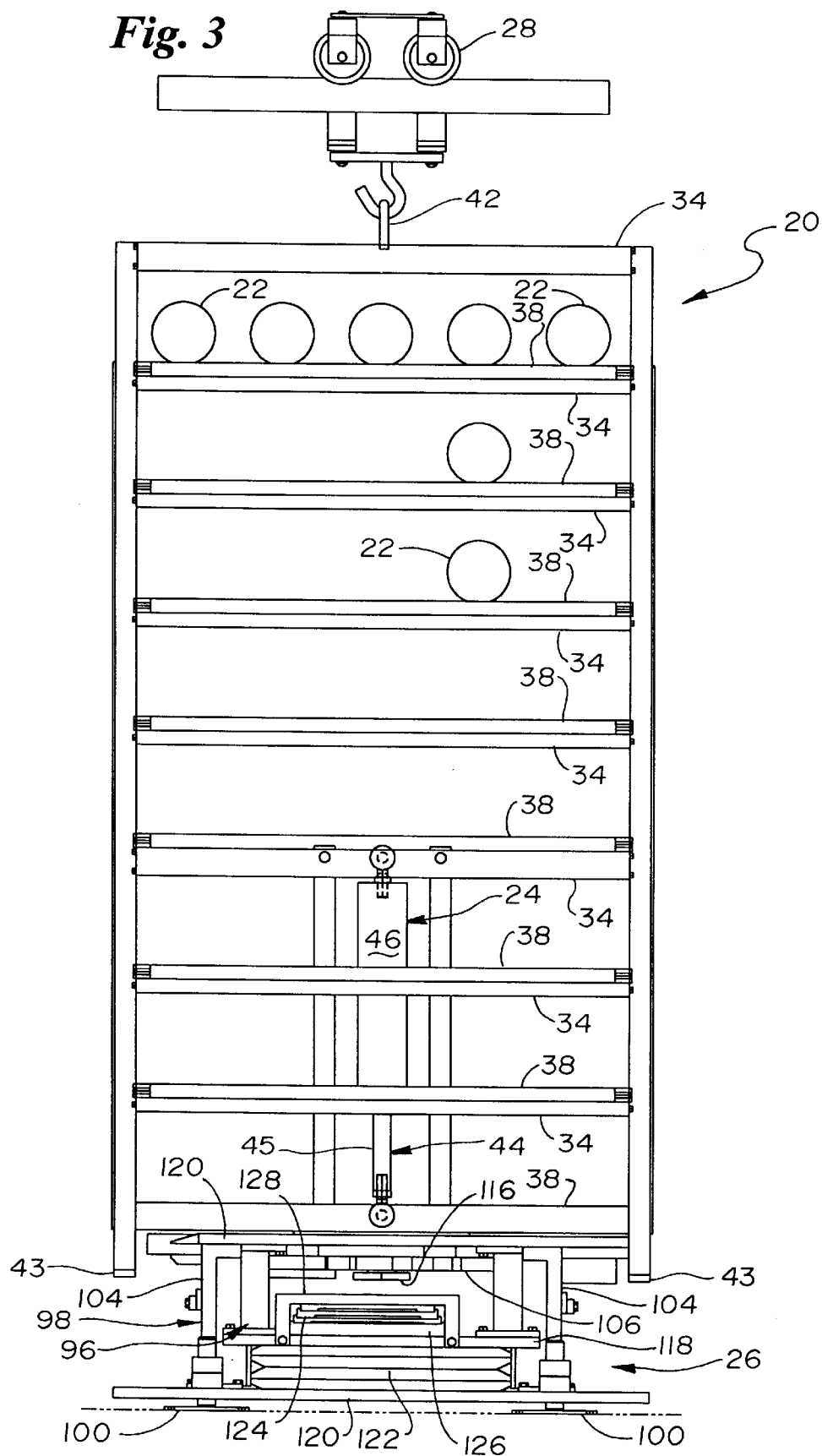
FIG. 3 is a right side view of the press rack and closing unit of FIG. 1, the press rack is shown in the loading position.
Figure 4:
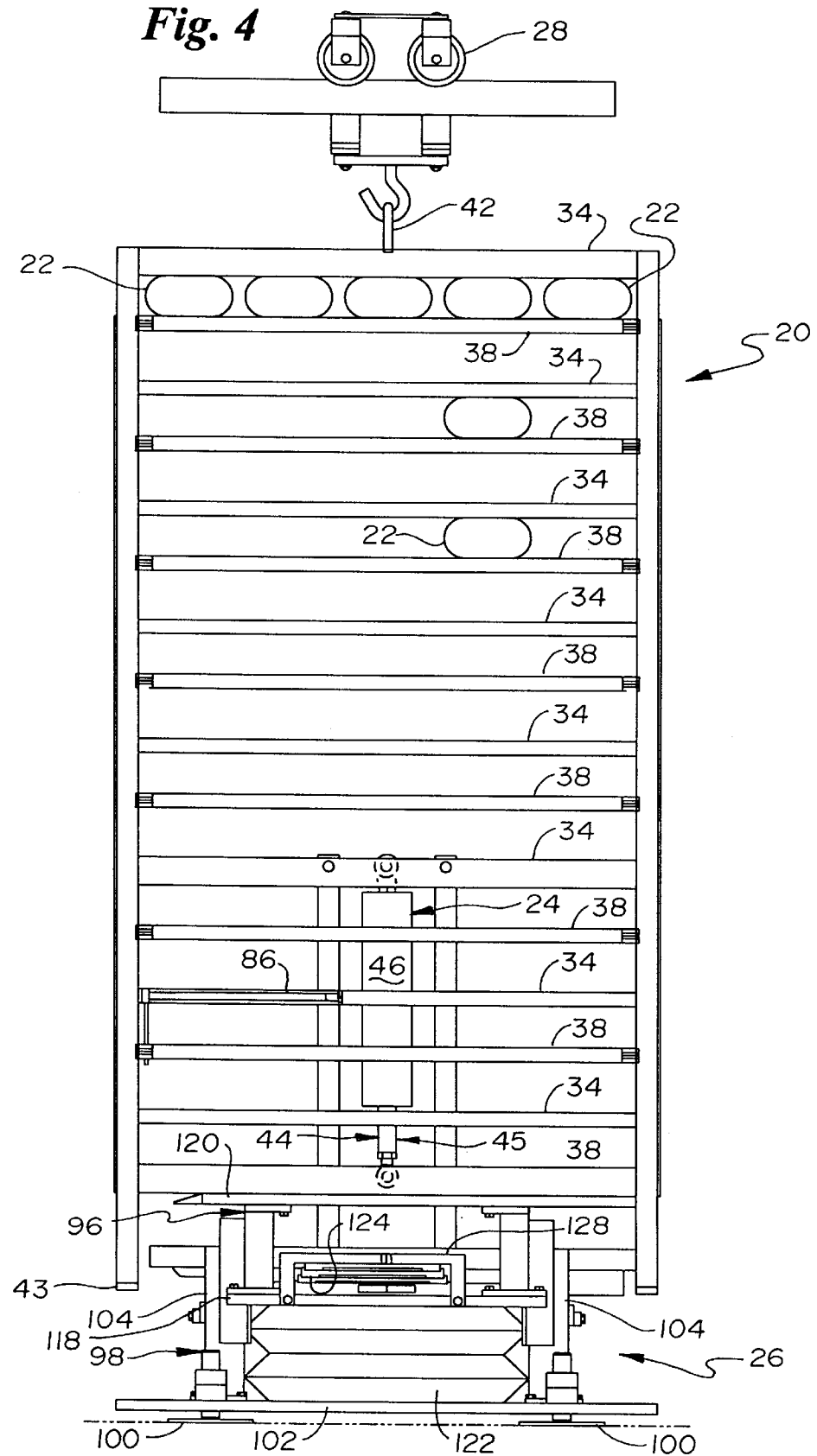
FIG. 4 is a right side view of the press rack and closing unit of FIG. 1, the press rack is shown in the pressing position.
Figure 5:
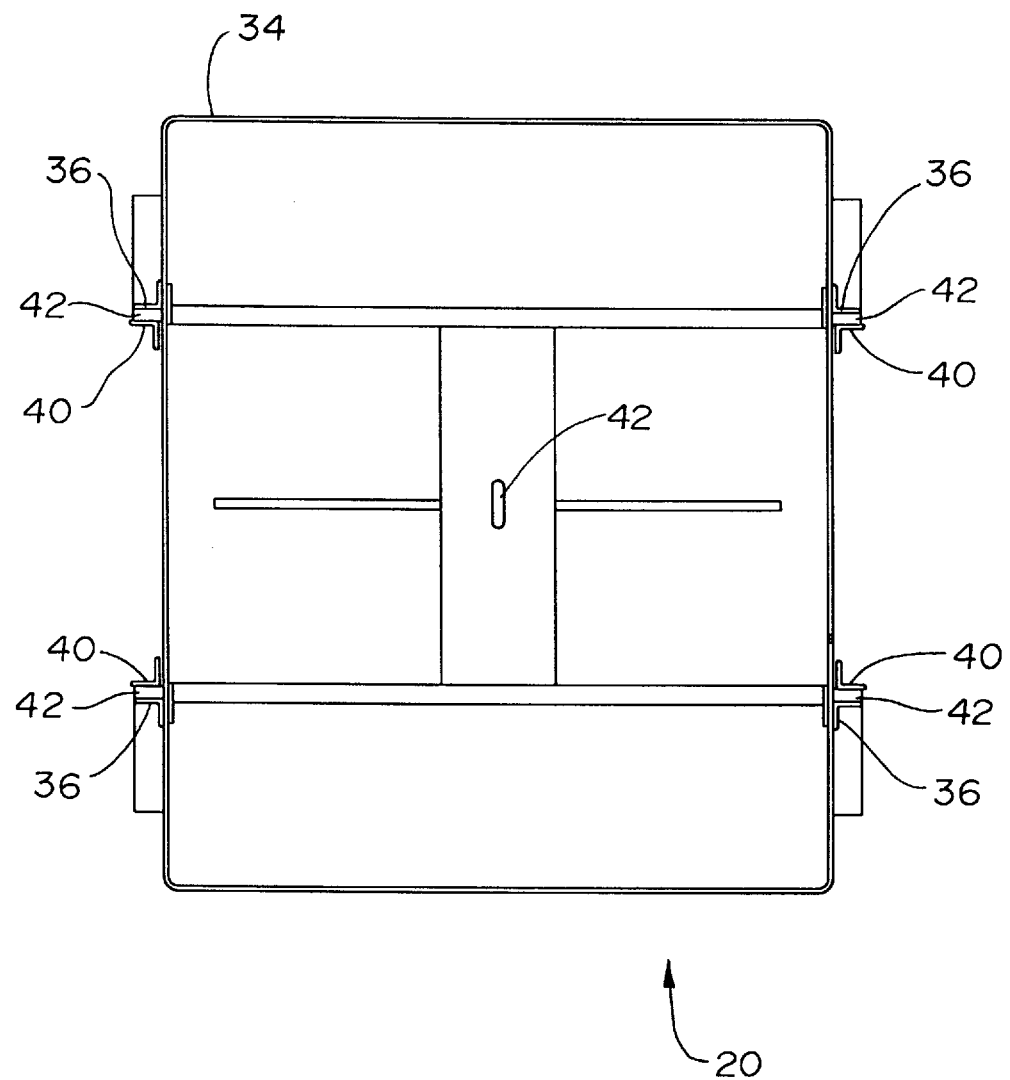
FIG. 5 is a top view of the press rack of FIG. 1.

In use of the press rack 20, the piston 44 reciprocates within the hydraulic cylinder 46 as the rack 20 is moved between the loading position (shown in FIGS. 1 and 3) and the pressing position (shown in FIGS. 2 and 4). When the rack 20 is moved from the loading position toward the pressing position, the piston 44 moves in a first direction indicated by arrow 78. As the piston 44 moves in the first direction 78, hydraulic fluid is forced through the first flow line 66 from the top reservoir 62 to the bottom reservoir 64. With the manual valve 72 closed, the hydraulic fluid is trapped in the bottom reservoir 64. Consequently, the confined fluid in the bottom reservoir 64 prevents the piston 44 from moving in a second direction indicated by arrow 80. It will be appreciated that the second direction 80 corresponds to the direction of piston 44 will move when the rack 20 is moved from the pressing position toward the loading position.

As discussed above, when the press rack reaches a desired pressing position in which there is a desired spacing between the top and bottom platens 34 and 38, the hydraulic locking mechanism 24 prevents the press rack 20 from moving from such a desired pressing position toward the loading position. This is accomplished by the one-way valve 68 and the manual valve 70 which cooperate to confine fluid in the bottom fluid reservoir 64 such that a hydraulic lock is generated. The hydraulic lock prevents the piston from moving in the second direction 80 relative to the hydraulic cylinder 46. In this manner, because the hydraulic cylinder 46 and the piston rod 45 are respectively connected to the first and second frames 30 and 32, the hydraulic locking mechanism 24 effectively locks the rack 20 in the desired pressing position.

To release the hydraulic lock, the manual valve 72 is opened such that the confined hydraulic fluid in the bottom reservoir 64 is allowed to flow to the top reservoir 62 through the second flow line 70. Once the manual valve 70 is open, the rack 20 is allowed to move from the pressing position toward the loading position in a slow and controlled manner. It will be appreciated that force for moving the rack 20 from the pressing position toward the loading position is typically generated via a combination of gravity and internal pressure within the pressed meat products 22.

Referring back to FIGS. 7 and 8, the hydraulic lock mechanism 24 allows the press rack 20 to be set or locked in an infinite number of pressing positions. The range of possible pressing positions is limited by the range of movement of the piston 44 relative to the hydraulic cylinder 46. In this regard, FIG. 7 illustrates the hydraulic locking mechanism 24 in a retracted orientation which corresponds to the press rack 20 being closed such that the smallest possible gap exists between each top and bottom platen 34 and 38. Also, FIG. 8 illustrates the hydraulic locking mechanism 24 in an extended orientation which corresponds to the press rack 20 being open such that the largest possible gap exists between each top and bottom platen 34 and 38.

Although the above paragraphs describe a specific single hydraulic locking mechanism configuration, it will be appreciated that alternative configurations may also be used. Additionally, the orientation of the hydraulic lift mechanism can be modified without departing from the principles of the present invention.

The hydraulic lock and release mechanism 24 of the press rack 20 also includes an actuating mechanism for selectively opening and closing the manual valve 72. As shown in FIGS. 1, 2, and 6, the actuating mechanism includes first and second levers 82 and 84 that are pivotally connected by plates 85 to one of the top platens 34 that is positioned intermediate the top and bottom reinforced platens 48 and 50. The first lever 82 is connected directly to the manual valve 72 by an elongated connecting member 86. By pivoting the first lever 82, the elongated connecting member 86 is pivoted about its longitudinal axis thereby causing the manual valve 72 to be opened or closed. A first spring 88 biases the first lever 82 toward a first position where the manual valve 72 is closed.

As shown in FIGS. 1, 2, and 6, the second lever 84 is positioned to the right of the first lever 82 and includes a locking member 90 that fits within a notch 92 defined by the first lever 82. The locking member 90 extends between the first and second levers 82 and 84 and is biased toward the notch 92 by a second spring 94.

The two lever configuration of the actuating mechanism is configured to require a user of the rack 20 to grasp each lever with a separate hand in order to release the hydraulic lock provided by the hydraulic locking mechanism 24. For example, if an operator attempts to only pivot the first lever 82, the locking member 90 engages the first lever 82 thereby preventing the first lever 82 from being pivoted. To properly use the actuating mechanism, an operator must first pivot the second lever 84 away from the first lever 82 such that the locking member 90 is removed from the notch 92. Once the second lever 84 is pivoted away from the first lever 82, the first lever 82 can be pivoted such that the manual valve 72 is opened. When the operator releases the levers 82 and 84, the springs 88 and 94 cause the manual valve 72 to be automatically closed.

Figure 13B:
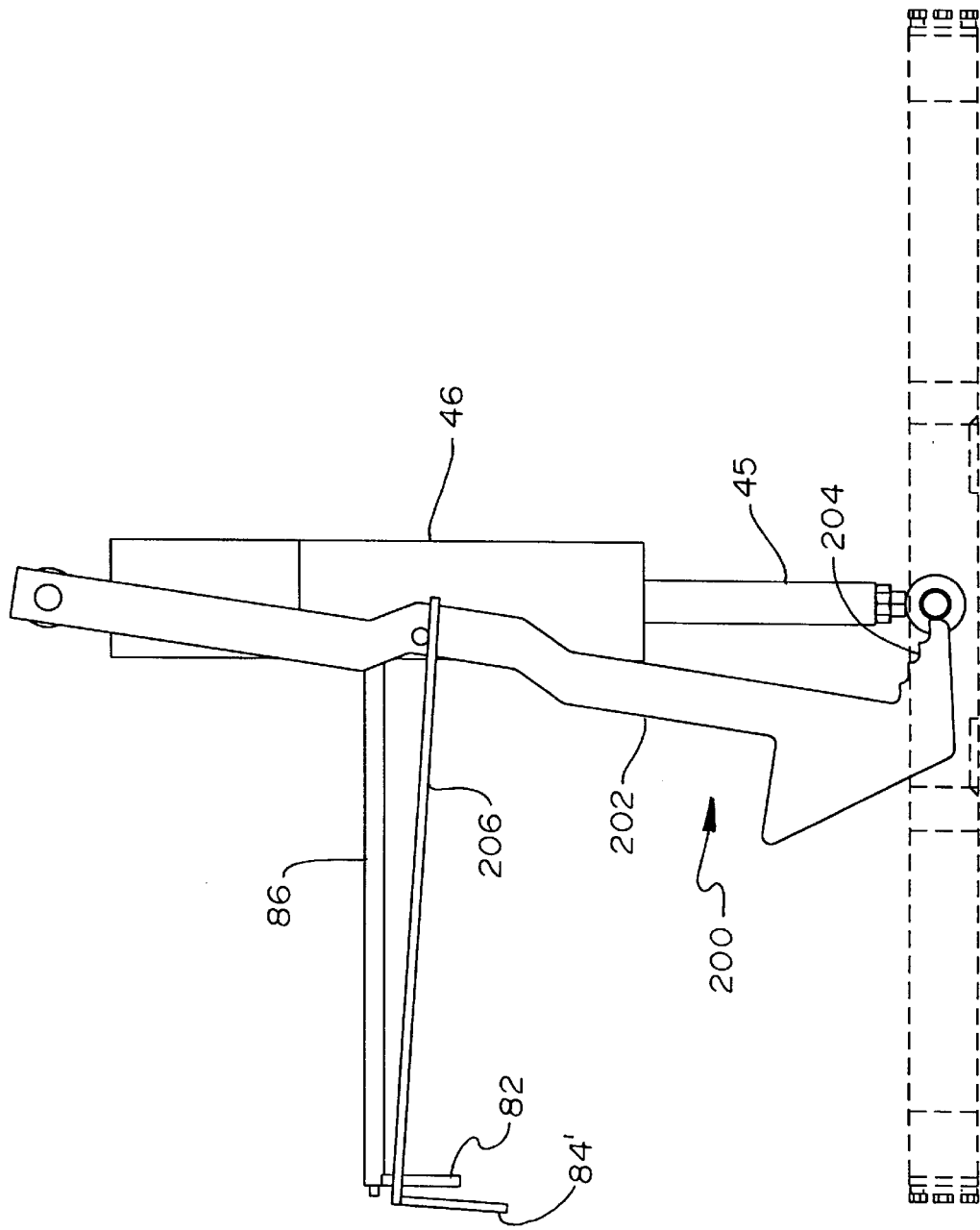
FIG. 13B illustrates the safety lock of FIG. 13A in a retracted position.

FIGS. 13A and 13B illustrate an alternative safety latch 200 configured to prevent an operator from pinching his or her fingers between the platens when the rack is opened. The safety latch 200 includes a latch member 202 that replaces the second lever 84 described above, and that is used in combination with the release lever 82 described above. The top of the latch member 202 is pivotally connected to the top of the hydraulic cylinder 46. The bottom of the latch member 202 forms a hook portion 204 including a plurality of steps. The hook portion is 204 is configured to selectively hook the connecting pin that fastens the piston rod 45 to the reinforced bottom plate 50. The safety latch also includes a pull lever 84' connected to the latch member 202 by an arm 206.

In use, an operator opens the rack by opening the manual valve 72 such that the rack moves, in a controlled manner, from the closed position toward the open position. In order for the rack to move to the full open position, the operator must concurrently turn the first lever 82 with one hand to open the manual valve 72, and pull the pull lever 84' with the other hand such that the hook portion 204 is pulled away from the cylinder (as shown in FIG. 13B). If the pull lever 84' is not pulled, the latch member 202 will prevent the rack from moving to the full open position. In this manner, the latch leaves sufficient spacing between the platens to prevent an operator's fingers from being pinched thereinbetween. The steps of the hook portion 204 allow the rack to be incrementally moved toward the full open position.

Figure 9A:
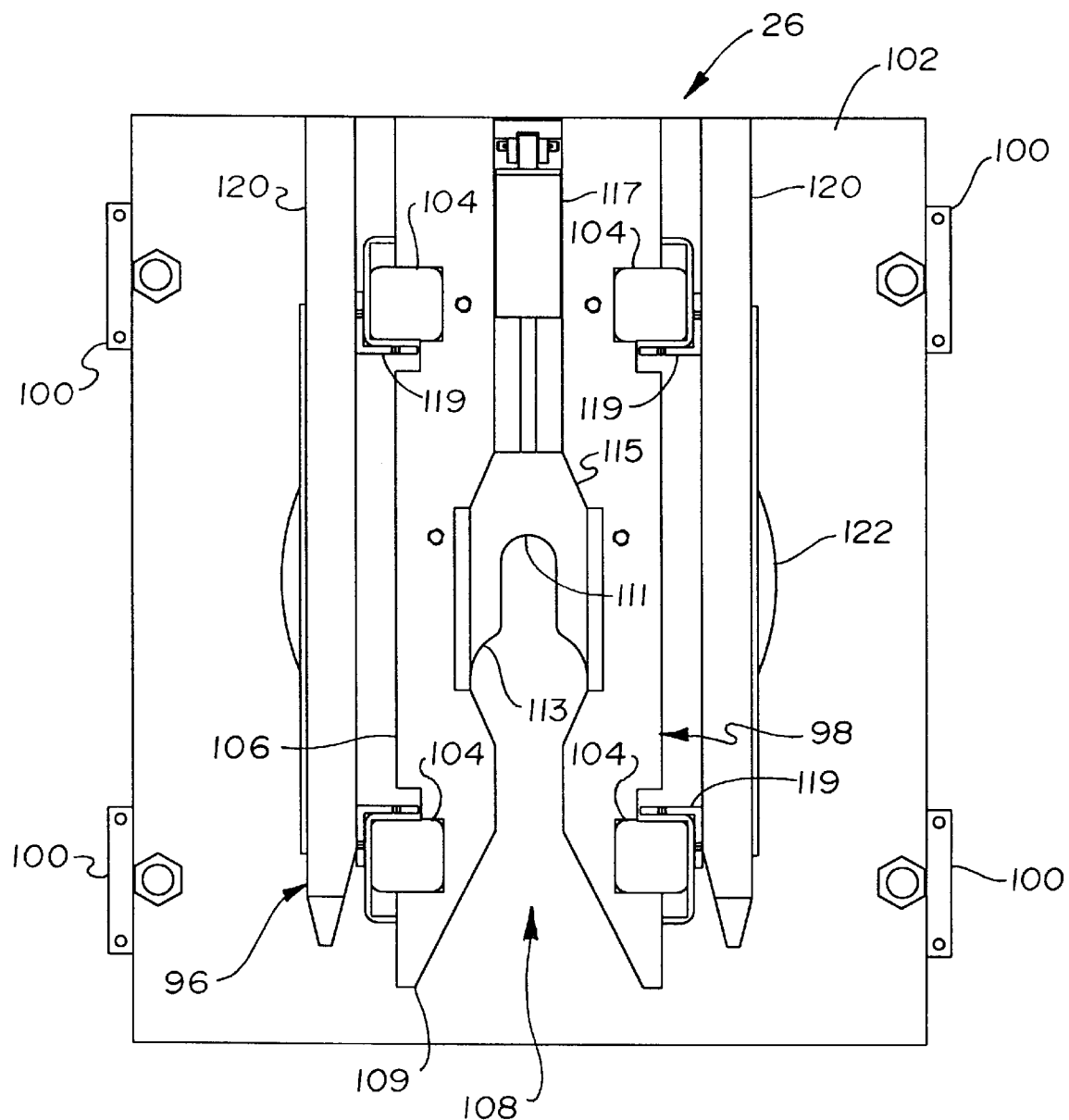
FIG. 9a is a top view of the closing unit of FIG. 1, a slide plate of the unit is shown in an extended position.
Figure 9B:
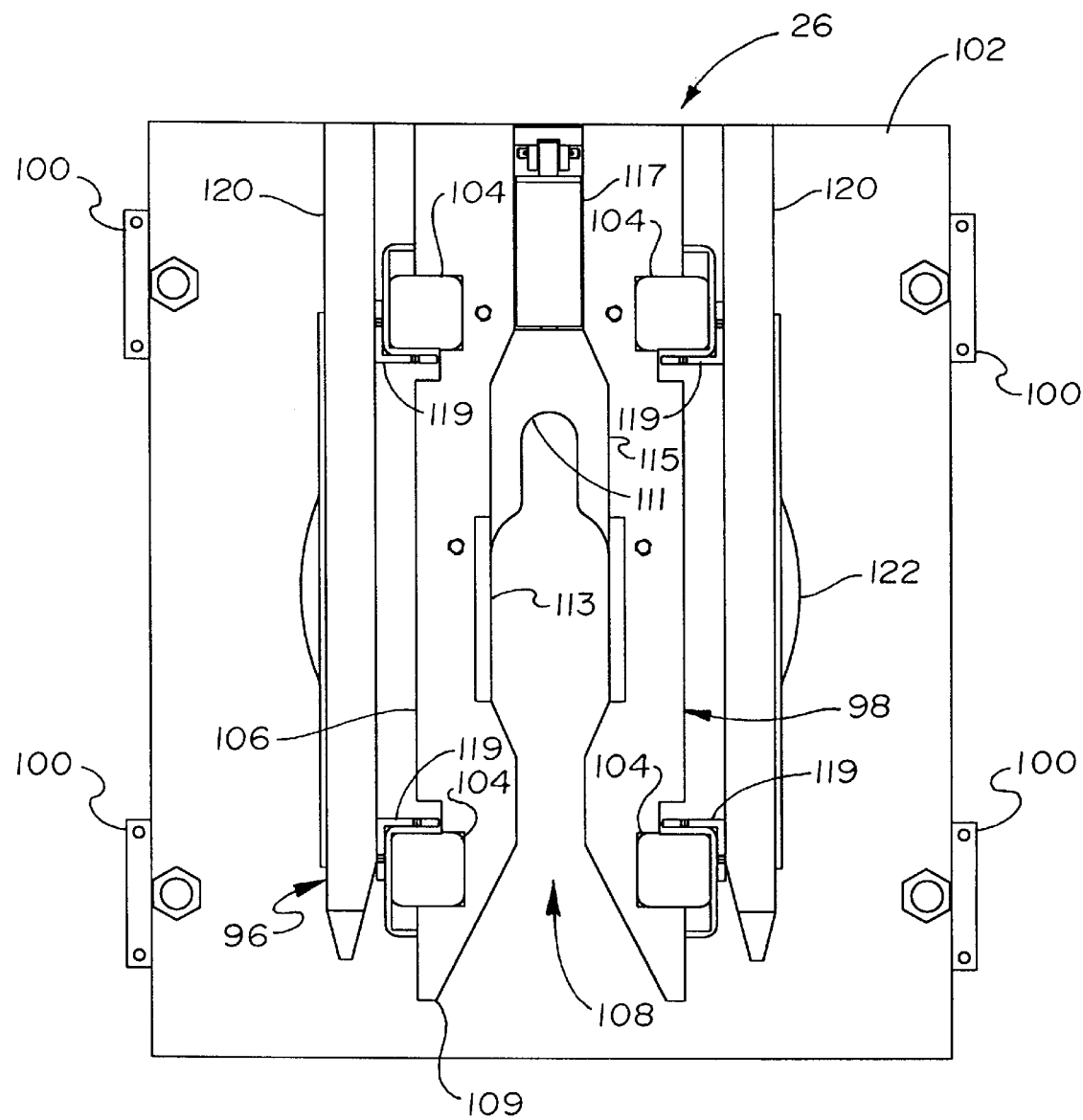
FIG. 9b is a top view of the closing unit of FIG. 1, a slide plate of the unit is shown in a retracted position.

The closing unit 26 of the present meat pressing system is preferably located at a closing station located along a travel route of the trolley system 28. As shown in FIGS. 1–4 and 9–11, the closing unit 26 includes a lift frame 96 that is slidably or reciprocally connected to an anchoring frame 98. The anchoring frame 98 includes feet 100 adapted to fixedly connect the anchoring frame 98 to a floor surface by conventional connecting techniques such as tack welding. A base plate 102 is fixedly connected to the feet 100. Slide members 104, shown in FIGS. 9a and 9b as separate pieces of square tubing, are fixedly connected to the top surface of the base plate 102 and preferably extend vertically upward from the base plate 102. A hold down plate 106 is fixedly connected between the slide members 104 and is aligned in approximately a horizontal plane. As best shown in FIGS. 9a and 9b, the hold down plate 106 defines an anchoring slot 108 extending through the hold down plate 106 in substantial alignment with the direction of travel of the trolley system 28.

The hold-down plate 106 of the anchoring frame 98 cooperates with a yoke structure 110 of the press rack 20 to selectively anchor the first frame 30 of the rack 20 relative to the ground or floor. As shown in FIG. 6, the yoke structure 110 is shown straddling the hydraulic cylinder 46. Specifically, the yoke structure 110 includes a pair of anchoring members 112 located on opposite sides of the hydraulic cylinder 46. First ends of the anchoring members 112 are fixedly connected to the first weldment 52 of the reinforced top platen 48. Second ends of the anchoring members 112 are located below the reinforced bottom platen 50 and are fixedly interconnected by a cross member 114. A flanged anchoring member 116, sized to fit within the anchoring slot 108, is fixedly connected to the bottom of the cross member 114. Preferably, the flanged anchor member 114 comprises a disk-tee having a tee shaped cross section. Similar to the hydraulic cylinder 46, the flanged anchoring member 116 is preferably aligned along the central longitudinal axis of the press rack 20.

Referring back to FIGS. 9a and 9b, the anchoring slot 108 of the hold-down plate 106 has an open end 109 positioned opposite from a closed end 111. The open end 109 is tapered to facilitate guiding the flanged anchoring member 116 into the slot 108. An enlarged portion 113 of the slot 108, having a width larger than the outermost dimension of the flanged member 116, is defined between the open and closed ends 109 and 111. The hold-down plate 106 also includes a slide plate 115 that is reciprocally movable along a longitudinal axis of the slot 108. The slide plate 115 defines the closed end 111 of the slot 108 as well as a portion of the enlarged portion 113 of the slot 108. A pneumatic cylinder 117 is used to selectively move the slide plate 115 toward and away from open end 109 of the slot 108. FIG. 9a shows the slide plate 115 in an extended position. The slide plate 115 is also moveable to a retracted position which is shown in FIG. 9b.

As describe above, the hold-down plate 106 of the anchoring frame 98 cooperates with the flanged anchoring member 116 of the rack 20 to anchor the first frame 30 relative to the ground surface. More specifically, the first frame 30 is anchored relative to the ground by moving the rack 20 such that the flanged anchoring member 116 slides within in the anchoring slot 108 and abuts against the closed end 111 of the slot 108. As inserted, with the slide plate 115 in the extended position, interference between flanged anchoring member 116 and the bottom of the slide plate 115 prevents the first frame 30 of the rack 20 from being moved vertically upward with respect to the anchoring frame 98 of the closing unit 26.

In certain circumstances, it is desired to lift the entire rack 20 above the closing unit 26 without having the first frame 30 of the rack 20 anchored. For example, while the rack 20 is in the loading position, it may be desired to lift the entire rack 20 above the closing unit 26 to facilitate manually loading meat products between the platens 34 and 38. This is accomplished by retracting the slide plate 115 from the extended position to the retracted position such that sufficient clearance is provided to allow the flanged anchoring member 116 to pass vertically upward through the anchoring slot 108. After the rack 20 has been lifted and loaded, the rack can be moved back downward such that the flanged anchoring member 116 passes vertically downward through the slot 108. Thereafter, the slide plate 115 can be moved back to the extended position such that the first frame 30 is re-anchored with respect to the ground surface.

As previously described, the lift frame 96 is slidably mounted on the anchoring frame 98. The lift frame 96 includes a base plate 118 located between the slide members 104 of the anchoring frame 98. A pair of closing rails 120, adapted to engage the bottom of the rack 20, extend vertically upward from the top surface of the base plate 118. The base plate 118 and closing rails 120 are slidably mounted on the slide members 104 by four angle irons 119. The angle irons 119 and the slide members 104 cooperate to allow the lift frame 96 to move vertically with respect to the anchoring frame 98. Preferably, plastic spacers or bearings are located between the angle irons 119 and the slide members 104 to facilitate sliding and to prevent metal on metal contact.

The closing unit 26 also includes an air bag or bellows structure 122 positioned between the top surface of the anchoring frame base plate 102 and the bottom surface of the lift frame base plate 118. When the airbag 122 is inflated, the lift frame 96 is moved vertically upward relative to the anchoring frame 98. By contrast, when the airbag 122 is deflated, the lift frame 96 moves vertically downward relative to the anchoring frame 98. While it is preferred to use an airbag 122 as a power source for driving the lift frame 96, it will be appreciated that alternative power sources such as mechanical jacks or other suitable mechanisms can also be used.

In use, the loaded press rack 20 is moved by the trolley system 28 toward the closing unit 26. The closing unit 26 is positioned along the route of the trolley 28 such that when the rack 20 reaches the closing unit 26, the flanged anchoring member 116 is received within the anchoring slot 108 defined by the hold-down plate 106 of the anchoring frame 98. The flanged anchoring member 116 slides along the slot 108 until it abuts the closed end 111 of the slot 108. At this point, if the rack 20 has not been pre-loaded, the slide plate 115 can be retracted to allow the entire rack 20 to be lifted for loading. Once the rack 20 is loaded, the entire rack 20 can be lowered such that the flanged anchoring member 116 is again received within the slot 108. Subsequently, the slide plate 115 can be moved from the retracted position to the extended position such that the flanged anchoring member 116 is securely re-captured within the slot 108.

Once the rack 20 has been loaded, and the flanged anchoring member 116 has been captured within the slot 108, the air bag 122 is inflated causing the closing rails 120 to press upward against the reinforced bottom platen 50 of the press rack 20. As the closing rails 120 press the reinforced bottom platen 50, the second frame 32 is pushed vertically upward causing the bottom platens 38 to move toward the top platens 34. As the second frame 32 moves upward, the first frame 30, which includes the top platens 34, is prevented from moving vertically upward through the cooperation of the yoke structure 110 and the anchoring frame 98. Specifically, the flanged anchoring member 116 of the yoke structure 110 engages the bottom of the hold-down plate 106 such that the first frame 30 is effectively tied down or anchored relative to the ground or floor surface. In this manner, the meat products 22 can be pressed within the rack 20 without requiring any external support structure located above the press rack 20 for restricting movement of the first frame 30.

Referring to FIGS. 1–4 and 10–11, the closing unit 26 is also equipped with structure for setting or controlling a desired closing distance between the loading position of the rack 20 and the pressing position of the rack 20. Such control is provided by controlling the range of relative vertical motion that is possible between the anchoring frame 98 and the lift frame 96.

As shown in FIGS. 1–4 and 10–11, the range of relative vertical movement between the anchoring frame 98 and the lift frame 96 can be varied by inserting or retracting shims or spacers 124 between the top surface of the lift frame base plate 118 and the bottom surface of the hold down plate 106. The shims 124 are retained within a holding tray 126 and preferably have a nested configuration. Any one or more of the shims 124 can be slid between a first position where the shims 124 are located between the hold down plate 106 and the lift frame base plate 118, and a second position in which the shims 124 are removed from the interior of the closing unit 26.

FIGS. 1–4 illustrate all of the shims 124 in the second position in which the shims 124 do not interfere with the movement of the lift frame 96. When the shims 124 are in such a position, the lift frame 96 can be moved vertically upward until the holding tray 126 engages the bottom of the hold down plate 106. Consequently, in such a position, the lift frame 96 has the maximum permissible range of vertical movement relative to the anchoring frame 98.

Figure 10:
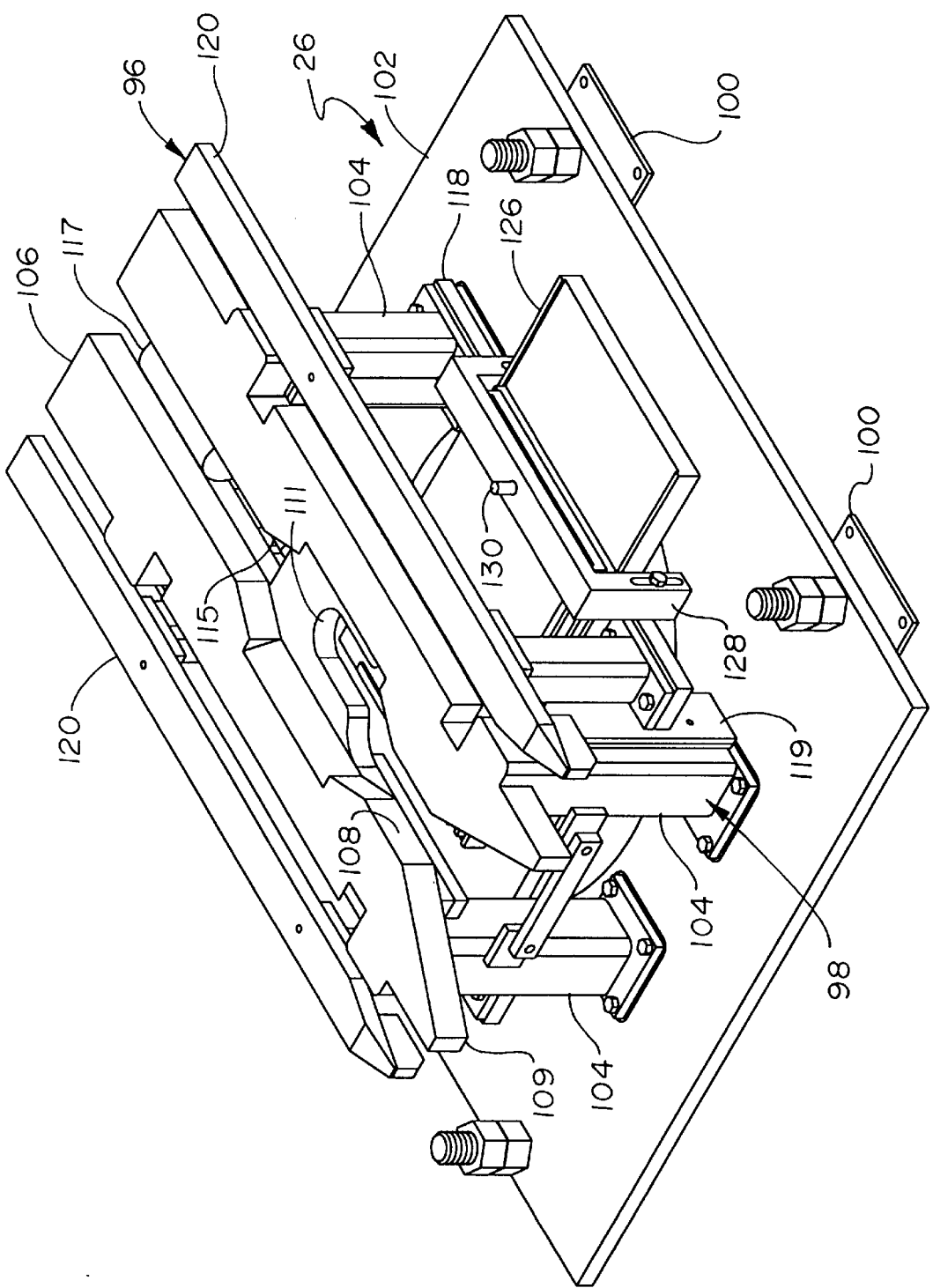
FIG. 10 is an isometric view of the closing unit of FIG. 1.
Figure 11:
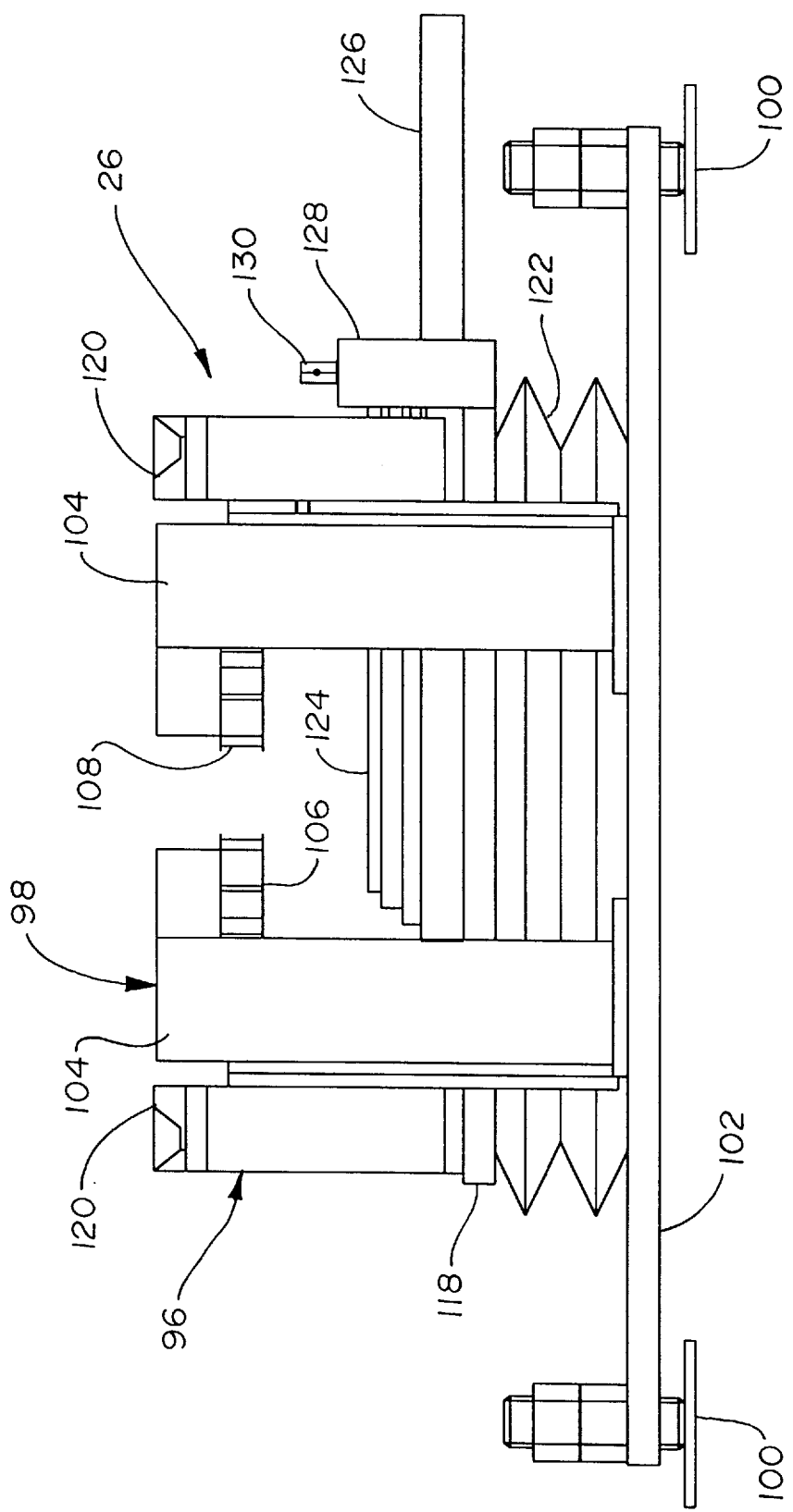
FIG. 11 is an enlarged front view of the closing unit of FIG. 1, the closing unit includes shims oriented for reducing the distance the closing unit closes the press rack.

FIGS. 10 and 11 show all of the shims 124 in the first position in which the shims 124 are located between the lift frame base plate 118 and the hold down plate 106. When the shims 124 are in such a position, the lift frame 96 is allowed to move vertically upward relative to the anchoring frame 98 until the shims 124 contact the bottom of the hold down plate 106. Consequently, as compared to the shim configuration shown in FIGS. 1–4, the range of vertical movement of the lift frame 96 is reduced by a distance equal to the combined thickness of the shims 124.

The holding tray 126 also includes a bracket 128 through which the shims 124 are inserted. The bracket 128 includes a vertically aligned locking pin 130 adapted to extend through co-axially aligned holes in the shims 124 to retain the shims 124 in desired configurations.

Figure 12:
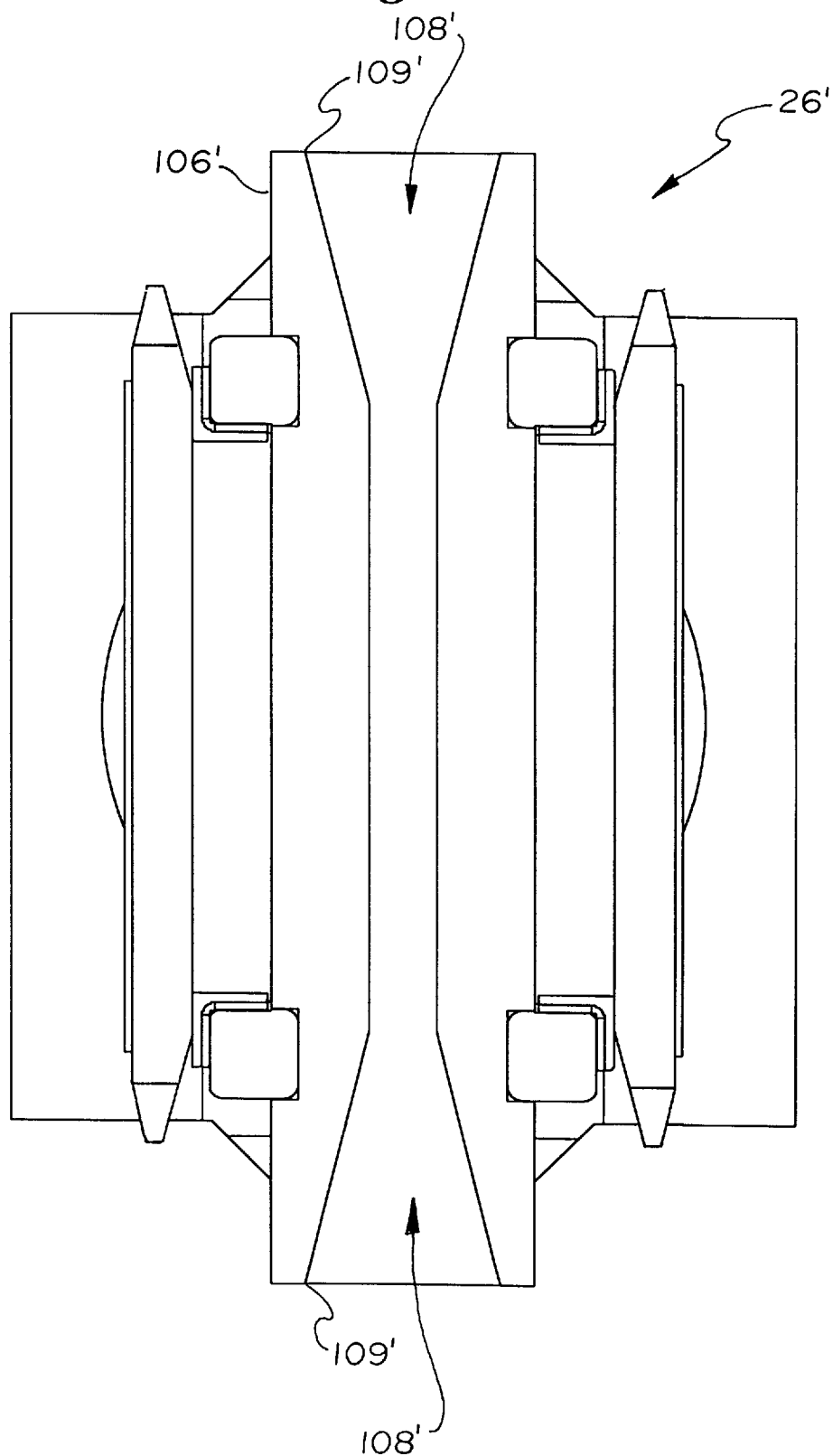
FIG. 12 is a top view of an alternative closing unit.

FIG. 12 shows an alternative closing unit 26' equipped with a hold-down plate 106' defining an anchoring slot 108' having two open ends 109'. The two open ended configuration of the anchoring slot 108' allows the rack to be moved in and out of the closing unit 26' without changing directions. With the exception of the modified hold-down plate 106', the closing unit 26' has substantially the same configuration as the previously described closing unit 26.

With regard to the foregoing description, it is to be understood that changes may be made in detail, especially in matters of the construction materials employed and the shape, size, and arrangement of the parts without departing from the scope of the present invention. It is intended that the specification and depicted embodiment or embodiments be considered exemplary only, with a true scope and spirit of the invention being indicated by the broad meaning of the following claims.

We claim:

1. An apparatus for pressing meat products, the apparatus comprising:

a first frame structure including a plurality of fixedly spaced-apart first platens;

a second frame structure including a plurality of spaced-apart second platens, the first and second frame structures being arranged such that the pluralities of first and second platens are aligned in a stack with each of the second platens being positioned below a respective one of the first platens, and the first and second frames being slidably interconnected and relatively moveable between a loading position in which the meat products can be loaded between the first and second platens, and a pressing position in which the first and second platens are adapted to press the meat products; and a locking mechanism constructed and arranged to selectively prevent the first and second frame structures from moving from the pressing position toward the loading position, the locking mechanism including a piston reciprocally mounted within a hydraulic cylinder, the hydraulic cylinder and piston being operatively connected between the first and second frame structures.

2. The apparatus of claim 1, wherein the locking mechanism includes a valve for controlling fluid flow within the hydraulic cylinder such that when the valve is open, the first and second frame structures are free to move from the pressing position toward the loading position, and when the valve is closed, the first and second frame structures are prevented from moving from the pressing position toward the loading position.

3. The apparatus of claim 2, further comprising a valve actuating mechanism including a first lever and a second lever, wherein an operator of the press rack is required to grasp each lever with a separate hand to actuate the valve.

4. The apparatus of claim 3, wherein the first lever is connected to the valve and is biased toward a first position in which the valve is closed, the second lever is biased toward the first lever, and the valve actuating mechanism further comprises a locking member extending between the first and second levers for preventing the first lever from moving unless the second lever is first moved.

5. The apparatus of claim 1, wherein the locking mechanism includes a manual valve and a one-way valve that cooperate to control fluid flow within the hydraulic cylinder.

6. The apparatus of claim 5, wherein the one-way valve allows the first and second frame structures to be moved from the loading position toward the pressing position, and the manual valve selectively prevents the first and second frame structures from being moved from the pressing position toward the loading position.

7. The apparatus of claim 5, wherein the hydraulic cylinder is substantially vertically aligned and the piston includes a top side and a bottom side, and wherein the one-way valve allows one-way fluid flow from the top side of the piston to the bottom side of the piston while the manual valve selectively allows fluid flow from the bottom side of the piston to the top side of the piston.

8. The apparatus of claim 5, wherein the locking mechanism includes first and second parallel fluid flow paths that provide fluid communication between first and second sides of the piston, and wherein the manual valve controls fluid flow through the first fluid flow path while the one-way valve controls fluid flow through the second fluid flow path.

9. The apparatus of claim 1, further comprising a closing unit for relatively moving the first and second frame structures from the loading position to the pressing position.

10. The apparatus of claim 9, wherein the closing unit includes means for anchoring the first frame relative to a floor surface, and the closing unit further includes means for moving the second frame structure relative to the first frame structure.

11. The apparatus of claim 10, wherein the means for moving includes a bellows structure.

12. The apparatus of claim 10, wherein the means for anchoring includes an anchoring frame adapted to be secured to the floor surface, the anchoring frame defining an anchoring slot arranged and configured to slidably receive a flanged anchoring member fixedly connected to the first frame structure.

13. The apparatus of claim 12, wherein the flanged anchoring member has a tee-shaped cross-section.

14. The apparatus of claim 9, wherein the closing unit includes means for setting a desired closing distance between the loading position and the pressing position.

15. The apparatus of claim 14, wherein the means for setting includes a plurality of spacers that can be removed from or added to the closing unit in order to vary the desired closing distance between the loading position and the pressing position.

* * * * *